(12) United States Patent
Radatti (10) Patent No.: US 7,503,069 B2
(45) Date of Patent: *Mar. 10, 2009

(54) NETWORK TRAFFIC INTERCEPTING METHOD AND SYSTEM

(75) Inventor: Peter V. Radatti, Conshohocken, PA (US)

(73) Assignee: CyberSoft, Inc., Conshohocken, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/861,672

(22) Filed: Jun. 4, 2004

(65) Prior Publication Data

US 2004/0230840 A1 Nov. 18, 2004

Related U.S. Application Data

(63) Continuation of application No. 09/244,154, filed on Feb. 3, 1999, now Pat. No. 6,763,467.

(51) Int. Cl.
G06F 21/00 (2006.01)
G06F 15/16 (2006.01)
G06F 11/30 (2006.01)

(52) U.S. Cl. .......................................... 726/22; 709/250

(58) Field of Classification Search ......... 713/151–154, 713/160, 161, 165, 188, 200–201; 709/223–229
See application file for complete search history.

(56) References Cited

U.S. PATENT DOCUMENTS

| | | | | | |
|---|---|---|---|---|---|
| 5,070,528 | A | * | 12/1991 | Hawe et al. ................. | 713/161 |
| 5,623,600 | A | * | 4/1997 | Ji et al. ....................... | 713/201 |
| 5,682,428 | A | * | 10/1997 | Johnson ...................... | 705/71 |
| 5,889,943 | A | * | 3/1999 | Ji et al. ....................... | 726/22 |
| 5,960,177 | A | * | 9/1999 | Tanno ......................... | 709/229 |
| 5,983,348 | A | * | 11/1999 | Ji ................................. | 713/200 |
| 5,987,610 | A | * | 11/1999 | Franczek et al. ........... | 713/200 |
| 5,991,402 | A | * | 11/1999 | Jia et al. ..................... | 705/59 |
| 6,085,224 | A | * | 7/2000 | Wagner ....................... | 709/203 |
| 6,088,803 | A | * | 7/2000 | Tso et al. .................... | 713/201 |
| 6,115,393 | A | * | 9/2000 | Engel et al. ................ | 370/469 |
| H1944 | H | * | 2/2001 | Cheswick et al. .......... | 713/201 |
| 6,393,568 | B1 | * | 5/2002 | Ranger et al. .............. | 713/188 |
| 6,397,335 | B1 | * | 5/2002 | Franczek et al. ........... | 726/24 |
| 6,763,467 | B1 | * | 7/2004 | Radatti et al. .............. | 726/24 |
| 7,299,361 | B1 | * | 11/2007 | Kim et al. ................... | 713/188 |
| 7,389,540 | B2 | * | 6/2008 | Radatti et al. .............. | 726/24 |
| 2006/0161981 | A1 | * | 7/2006 | Sheth et al. ................ | 726/22 |
| 2006/0224724 | A1 | * | 10/2006 | Marinescu et al. ......... | 709/224 |
| 2007/0192861 | A1 | * | 8/2007 | Varghese et al. ........... | 726/23 |

(Continued)

*Primary Examiner*—Christopher A Revak
(74) *Attorney, Agent, or Firm*—John F. A. Earley, III; Frank J. Bonini, Jr.; Harding, Earley, Follmer & Frailey (57) ABSTRACT

A computer system and method for intercepting, examining, and controlling data streams flowing via transport connections between the transport layer of an operating system and the user application. All data streams that pass from an external network, through the transport layer of an operating system to the user application or from the user application to the transport layer are intercepted by a network traffic interceptor. The network traffic interceptor processes all data streams for proscribed data that may include viruses, trojan horses, worms, and other hostile algorithms. The processing used by the network traffic interceptor can include monitoring, blocking or destroying data, thereby protecting the single computer system from being infected by hostile algorithms.

32 Claims, 4 Drawing Sheets

U.S. PATENT DOCUMENTS

2008/0034072 A1* 2/2008 He et al. .................... 709/223
2008/0046558 A1* 2/2008 Raja et al. .................. 709/224
2008/0086773 A1* 4/2008 Tuvell et al. ................. 726/23
2008/0086776 A1* 4/2008 Tuvell et al. ................. 726/24
2008/0228911 A1* 9/2008 Mackey ...................... 709/224

* cited by examiner

NETWORK TRAFFIC INTERCEPTING METHOD AND SYSTEM

CROSS-REFERENCE TO RELATED APPLICATIONS

This application is a continuation of U.S. Ser. No. 09/244,154, entitled "NETWORK TRAFFIC INTERCEPTING METHOD AND SYSTEM," filed on Feb. 3, 1999 now issued as U.S. Pat. No. 6,763,467, by Peter V. Radatti and David J. Harding and assigned to CyberSoft Inc., which disclosure is incorporated herein by reference.

FIELD OF THE INVENTION

The present invention relates to a system and method conducted within a single computer for intercepting, examining and controlling data streams flowing via transport connections between the transport layer of an operating system and the user application; and more specifically for protecting the computer from invasion by viruses, trojan horses, worms and other hostile algorithms.

BACKGROUND OF THE INVENTION

The rise of the Internet and networking technologies has resulted in the widespread sharing of data between computers. This data is not always what it seems to be. Data that is accessed on a remote machine and downloaded to a computer system can contain hostile algorithms that can potentially destroy data, crash the system, corrupt data or worse. Some of these hostile algorithms are viruses, worms, and trojan horses. Viruses are computer programs that parasitically copy themselves into other programs. Worms are independent programs that reproduce by copying themselves from one computer to another over a network.

Worms, unlike viruses are not parasitic. Trojan horses are code fragments that hide inside of program that appears to do something else. Quite often Trojan horses hide inside of utility programs or other popular programs that are downloaded. The existing program often performs a useful function while masking the presence of the internal trojan horse.

Finally, it is possible for a person to manually enter commands or to direct byte streams to a computer over a network with hostile intent.

Virus, worms, and trojan horses can infect an internal network or single computer system when the internal network or computer system executes a program from the external network that contains the hostile algorithm. All binary executables, unreviewed shell scripts, and source code accessed from an external network may contain worms, viruses, or trojan horses. In addition, outside binary executables, shell scripts, and scanned source code may enter an internal network or single computer system through an E-mail attachment. Also, executables can be directly accessed from an external network through the IFTP program, a world-wide web browser, or an outside contractor whose network already has been compromised.

Firewalls and proxy servers are well known means for protecting an internal network or single computer system from hostile algorithms from an external network. When a firewall is installed, all communication from the external network is routed through a proxy server outside of the internal network, and the proxy server determines whether a particular message or file is authorized to pass through to the internal network.

Figure 1:
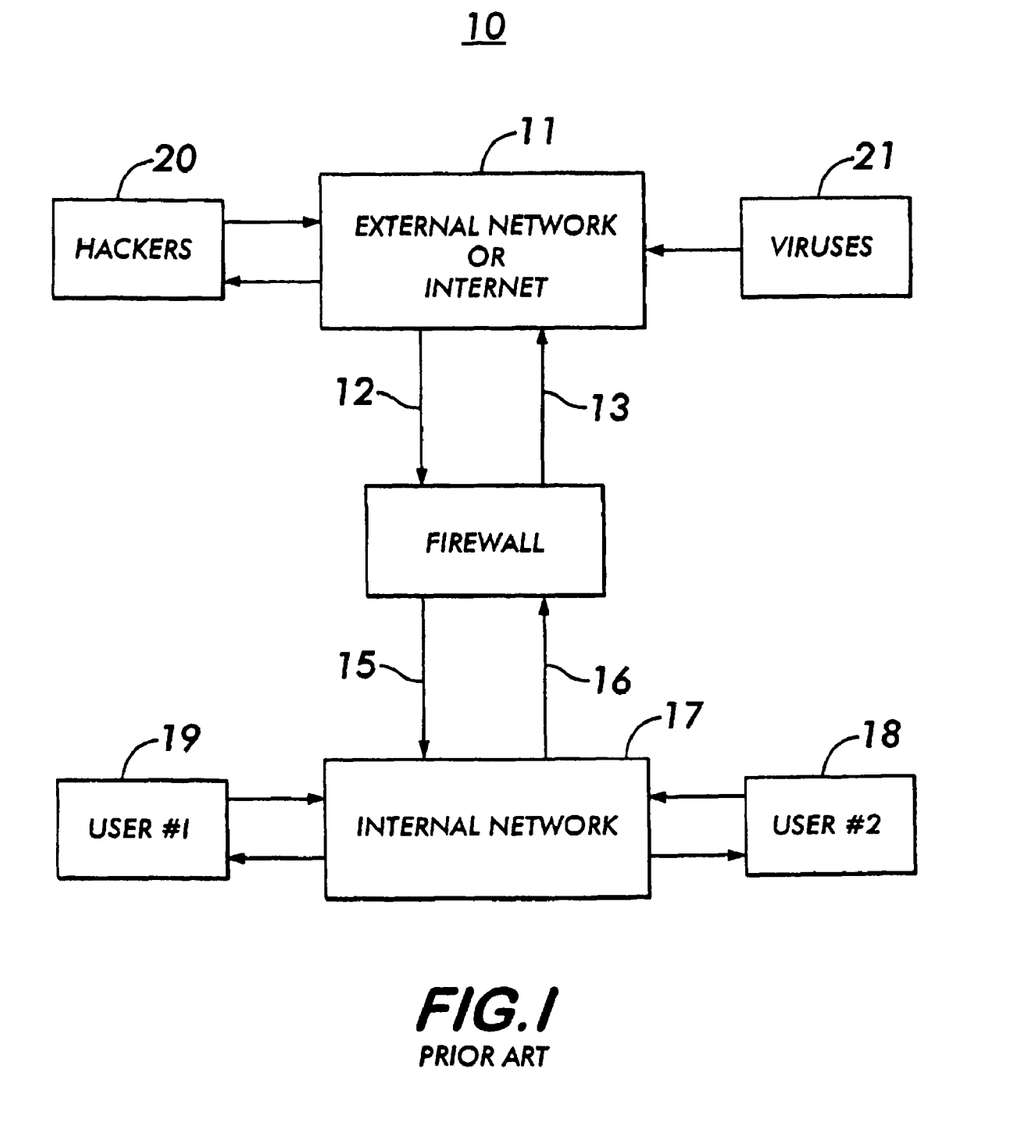
FIG. 1 is a block diagram of a prior art computer information system utilizing a firewall between external and internal network systems.

Reference is now made to FIG. 1, which is a block diagram of a computer information system utilizing a firewall between external and internal network systems. The computer information system 10 contains an external network 11, which may include the internet, which is accessible by hackers 20 or computer viruses 21. Generally, hackers 20 are persons who gain unauthorized access to a computer system. The external network 11 is connected to the firewall by a first incoming bus 12 and a first outgoing bus 13. The bus comprises specialized groups of lines that carry different types of information. A bus has a specific bandwidth, which is the data transfer capacity of a digital communications system. The first incoming bus 12 sends data to the firewall 14. The firewall 14 determines which data is authorized to be transmitted to the internal network 17. The data transferred from the firewall 14 to the internal network is transferred via a second incoming bus 15. In addition, data is sent from the internal network 17 to the firewall 14 via a second outgoing bus 16. Once the data has been transferred to the internal network 17, it can be accessed by users 18 and 19 of the internal network.

In a functional firewall computer system 10, hostile algorithms invading the external network 11 by hackers 20 or computer viruses 21 are transported via the first incoming bus 12 to the firewall 14. Once processed by the firewall 14, the hostile algorithms are denied authorization to flow via second incoming bus 15 to the internal network 17. As a result, the users 18 and 19 of the internal network 17 are not subjected to the problems that can be caused by hostile algorithms.

Generally, the bandwidth of the buses 12 and 13 between the external network 11 and the firewall 14 is equal to the bandwidth of the buses 15 and 16 between the internal network 17 and the firewall 14.

Typical of such firewall systems includes, for example, U.S. Pat. No. 5,550,984 to Gelb; U.S. Pat. No. 5,623,600 to Ji et al; and U.S. Pat. No. 5,815,571 to Finley, all of which are incorporated herein by reference.

Unfortunately, all of the computer systems that utilized firewalls impose a number of disadvantages on the entire system. Initially, the firewalls must be placed at the "choke point" at which an outside network enters the internal network. This creates a problem in that the firewall becomes a central point of failure, whereby if the firewall fails, the entire connection to the external network fails. In addition, since the bandwidth of the connection between the internal network and the firewall normally is equal to the bandwidth of the connection between the firewall and the external network, the firewall will add latency to the connection by performing its function. This latency normally increases the demand on bandwidth utilization. Very often, the firewall latency will cause utilization of the available bandwidth to degrade such that all available bandwidth cannot be utilized. This can occur either linearly or logarithmically depending upon the specific implementation of the firewall, speed of the bus connections, and resource availability within the firewall.

Another disadvantage is that the connection to the external network is normally limited by the available bandwidth purchased on a detected communications circuit.

Finally, since a firewall does not exist between the users on the internal network, another one of the users of the network can attack the internal system. It is an observation within the security industry that 80% of all attacks against a system originate on the internal network while only 20% of attacks originate from an external network.

Accordingly, it is an object of the current invention to provide a computer intercepting system and method that does not utilize a firewall, or other form of proxy server.

It is another object of the current invention to provide a computer intercepting system and method that does not have a central point of failure.

It is a further object of this current invention to provide a computer intercepting system and method that will not add latency to the system.

Also, it is an object of the current invention to enable all of the bandwidth to be utilized while the computer security system is being accessed.

It is yet another object of the current invention to provide protection from attacks by users on the internal network.

Other objects and advantages of this invention will become apparent from the description taken in connection with the accompanying drawings that are presented by way of illustration and example.

SUMMARY OF THE INVENTION

These and other objects of the present invention are provided by a computer system and method for intercepting, examining, and controlling data streams flowing via transport connections between the transport layer of an operating system and the user application. Preferably, the computer system and method operates on a single computer system. The system and method protect the computer from invasion by viruses, trojan horses, worms, and other hostile algorithms.

The method of this invention preferably operates within a single computer system. Advantageously, the data streams that pass from the transport layer of an operating system to the user application or from the user application to the transport layer must be intercepted by the novel network traffic interceptor "NTI" of the current invention. The NTI processes all data streams for proscribed data that may include viruses, trojan horses, worms, manually typed hostile commands, other hostile algorithms, and forbidden data. The processing used by the NTI can include monitoring, blocking, logging, quarantining, destroying or passing on data. Because all data must be process by the NTI before being passed to the user application, the NTI can block proscribed data before it has the ability to infect the computer.

The NTI prevents the proscribed data from altering other data streams in the computer system in a manner that changes the data streams or harms the computer program. As a result, the data streams and programs continue to function as intended and programmed rather than functioning pursuant to the unauthorized commands of the viruses, trojan horses, worms, manually typed hostile commands, and hostile algorithms.

In addition, proscribed data includes forbidden data, which is data that the programmer blocks from being accessed by the computer. An example of forbidden data would be pornographic material on a computer used by children.

This method is an intercepting method contained within a single computer system, rather than a firewall system utilizing a separate proxy server. As a result, only the individual computer system is impacted by utilization of the NTI and its use does not add latency to the entire system. In addition, because the NTI is located within a single computer system, hostile algorithms originating outside the system but within the internal network still cannot by-pass the NTI to infect the individual computer.

The system of the present invention utilizes a single computer system connected via a transport connection to an external network. Data from the external network passes to the transport layer of the operating system within the single computer system. Transport connections pass the data to the NTI, where the data is processed before allowing the data to pass via transport connections to the user application. The data flow may also operate in the reverse direction wherein it originates in the user application and passes to the external network.

DETAILED DESCRIPTION OF THE PREFERRED EMBODIMENTS

Figure 2:
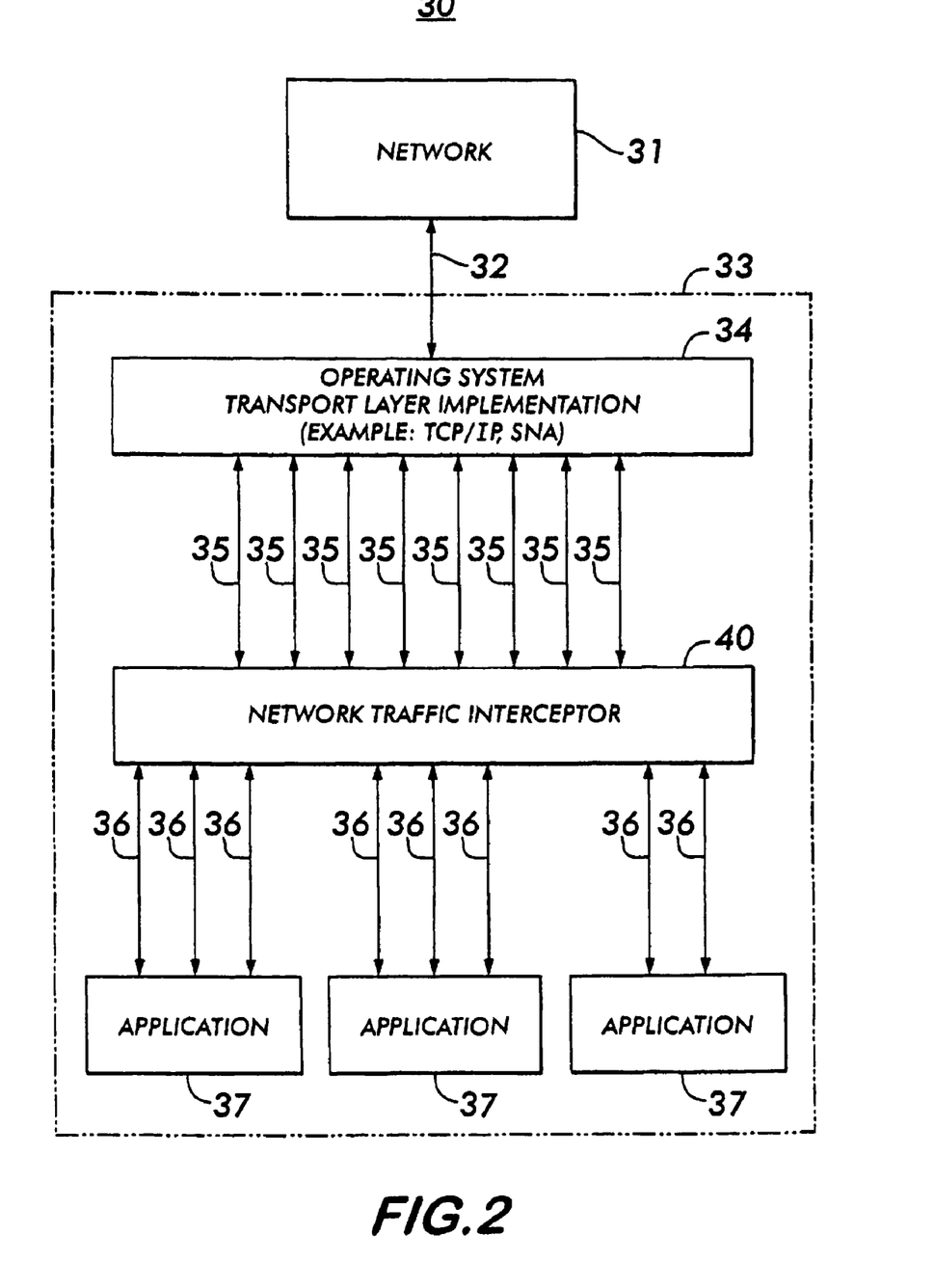
FIG. 2 is a block diagram showing a preferred embodiment of the computer method and system for intercepting, examining, and controlling transport layer data streams.

FIG. 2 depicts a functioning block diagram showing a preferred embodiment of the computer system and method 30 for intercepting, examining, and controlling transport layer data streams. In FIG. 2, a network 31 communicates by means of transport connections 32 with a single computer system 33. The network 31 includes all forms of communication into or out of the computer system 33. Generally, the network 31 would include an external networking system, such as the internet, or an internal networking system.

In this embodiment, the computer 33 represents a single computer system. The computer system 33 can be a multi-user or single-user system having one or more Central Processing Units (CPUs.)

Within the computer system 33 reside the transport layer 34 of the operating system, the network traffic interceptor ("NTI") 40, and one or more user applications 37.

The transport connections 32 transport the data stream from the network 31 to the transport layer 34 housed within the computer system 33.

The transport layer 34 represents a transport layer implementation of an operating system. A transport layer is the fourth layer of seven layers in the Open System's Interconnection ("OSI") reference model. The seven layers of the ISO are Physical, Data-link, Network, Transport, Session, Presentation, and Application. The transport layer provides reliability through data flow control and error recovery methods. It conforms the incoming message into properly sized packets and re-conforms them in the proper order at their destination. Although any protocols can be used, preferred protocols include TCP/IP and SNA. TCP/IP, transmission control protocol/internet protocol, represents protocols that control the transport layer and network layer of networks including networks that operate under internet technologies. TCP/IP provides standardized communication between nodes on a computer network and between networks. The TCP standards relate to what is inside the data packet, while the IP relates to sending the packet. TCP/IP is not restricted to any one network topology; it can run on Ethernet and other bus topologies, token ring, and point-to-point leased lines. SNA, Systems Network Architecture, links IBM and non-IBM devices together.

While any operating system may be used with the system and method 30, two preferred varieties are Microsoft Windows® and UNIX® platforms.

After being processed by the transport layer 34, the data streams are intercepted via transport connections 35 by the NTI 40. The transport connections 35 are capable of transporting data streams both from the transport layer 34 to the NTI 40 and from the NTI 40 to the transport layer. It is not possible for the data streams to bypass the NTI 40. In general, after intercepting the data streams, the NTI 40 scans the data streams for information content and relays the data streams to a destination based on the information content.

The NTI 40 monitors the data attempting to pass from the transport layer 34 to a user application 37, such as a web browser, E-mail, FTP, Telnet, etc. The NTI 40 resides in and provides protection for a single computer system 33, which is the destination of the network data transmission. As will be explained in greater detail in reference to FIG. 3, the NTI 40 is a computer method and system for intercepting, examining, and modifying transport layer data streams within a single computer system 33 before allowing the data streams to pass to the user application 37 that is being executed on the computer. After intercepting the data streams, the NTI 40 scans the data streams for information content.

After being processed in the NTI 40, the data streams are transmitted to the applications 37, which are the destination of the connection. The data is transported to the applications 37 by means of transport connections 36, which are created by the NTI 40. Normally, the capacity of transport connections 35 created between the transport layer 34 and the NTI 40 is equal to the capacity of transport connections 36 created between the NTI 40 and applications 37; however, additional capacity may be created between the NTI 40 and applications 37 due to overhead requirements. The applications 37 normally communicate directly with the transport layer 34 when the NTI 40 is not present. The applications 37 may include all browsers including Microsoft Internet Explorer (versions 3.x and 4.x and higher) and Netscape Navigator/Communicator (versions 3.x and 4.x and higher.)

The computer system and method 30 also can function wherein the data streams originate in the application 37 and end in the network 31. In this embodiment, the applications 37 request data from the network 31. The request is initiated at the application 37 level. The request travels through the transport connections 36 to the NTI 40. Thereafter, the data streams travel through the transport connections 35 to the transport layer 34, wherein the transport layer implementation of the operating system enables the data stream to communicate with the network 31 via the transport connections 32.

Figure 3:
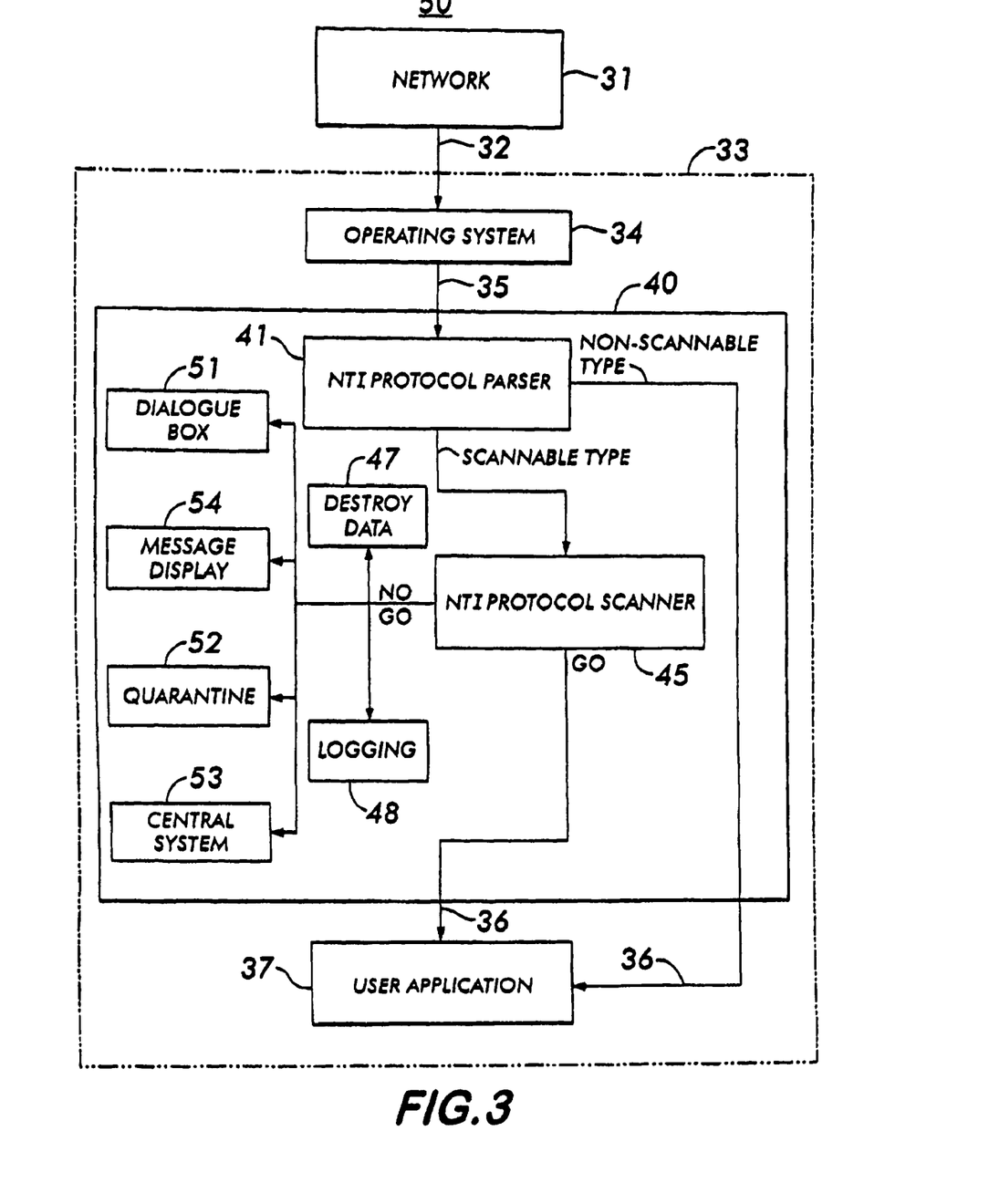
FIG. 3 is a flow chart showing a preferred embodiment of the computer method and system for intercepting, examining, and controlling transport layer data streams.

Reference is now made to FIG. 3, which is a flow chart showing a preferred embodiment of the computer method and system 50 for intercepting, examining, and modifying transport layer data streams. This method and system 50 utilizes the system embodied in FIG. 2, as previously described. In the current embodiment, the transport layer 34 may contain a dynamic link library ("DLL"). A dynamic-link library is a feature of Microsoft Windows® that allows executable code modules to be loaded on demand and linked at run-time.

In this embodiment, the data stream travels from the transport layer 34 through the transport connectors 35 to the NTI 40. The NTI protocol parser 41 examines all of the data entering or leaving the network to determine if it is of a type that the NTI protocol scanner 45 can scan for information content; including E-mail and its attachments, JAVA Applets, FTP and remote "save-as" transfers, and HTML/SGML data. Once the type is determined as a "scannable" type, being one of the types scannable by the NTI protocol scanner 45, or once the type is determined as a "non-scannable" type, being non-scannable for information content, the data is relayed based on the ability to scan it for information content. If the data is classified as a "non-scannable" type, it is passed through NTI 40 to the user application 37 via transport connections 36. If the data is determined as a "scannable" type, it is passed in its entirety to the NTI protocol scanner 45 where it is scanned for hostile algorithms. Scannable data is data that contains proscribed data. Non-scannable data is data that does not contain proscribed data. The scanning may be conducted by an engine sold under the trademark VFind®, which is trademarked by CyberSoft, Inc., or by any other equivalent scanning system.

After the scanning has occurred, the data will be given a GO or NOGO designation based on a result of the scanning process. Upon a GO designation, the data stream is passed through in its original form to the associated user application 37 via transport connections 36. In the event of a NOGO designation, the data stream is blocked from being passed to the user application 37. In addition, the event may be logged in a logging file 48, the user may be notified of the event via a dialogue box 51 or message display 54, the data may be destroyed 47 within the system, the data may be quarantined 52 and/or it may be forwarded to a central system 53 for later analysis.

If the data is classified as a "scannable" type, the user application 37 never is allowed access to the data prior to scanning. In addition, when the data is identified as a "scannable" type, the NTI application 45 will preferably make note of the place of origin, the date, the size, the type, and the result of the scanning for future use in logging procedures.

Scanning that is performed by an engine such as the engine sold under the trademark VFind® will automatically unwrap any data that requires unwrapping, including, but not limited to E-mail attachments, MIME, UUENCODE, UNIX Compress, GZIP, PKZIP, ZIP2EXE, TAR, and others.

The NTI 40, as illustrated in this embodiment, may be used for blocking the transmission of proscribed data. The proscribed data that can be blocked includes viruses, trojan horses, worms, and other hostile algorithms.

In addition, as illustrated by this embodiment, when a NOGO designation is made, the NTI 40 can be used for monitoring the transmission of data. The monitoring which can occur includes watching for key words of concern in network traffic. In addition, the NTI 40 can be applied to block the transmission of data containing key words of concern.

Further, this embodiment can be used for blocking the use of certain network services, such as discriminating between transmission control protocol port numbers. This embodiment also may discriminate between incoming and out-going connections as well as between incoming and out-going data.

Figure 4:
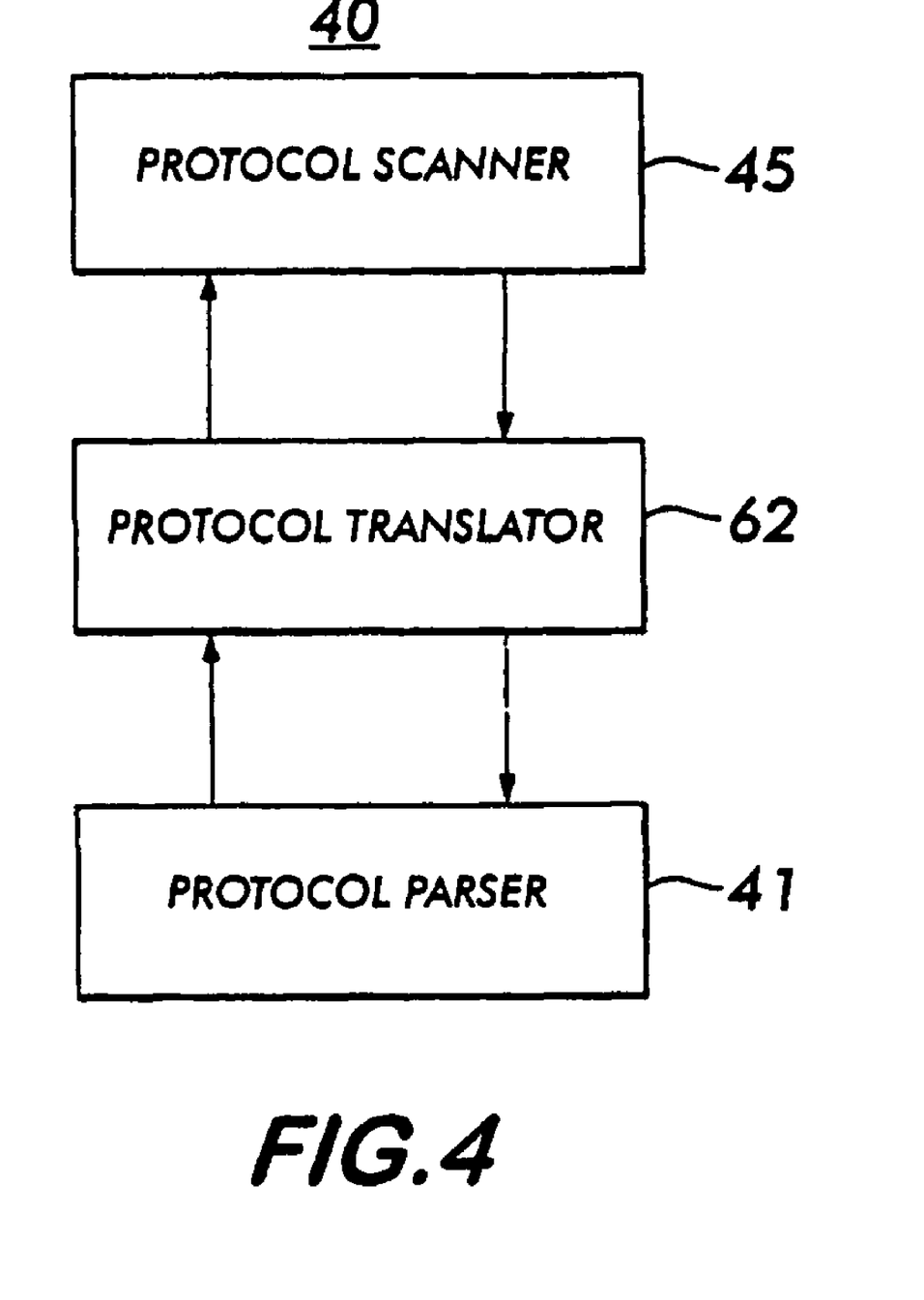
FIG. 4 is a block diagram showing a preferred embodiment of a partial representation of the computer method and system for intercepting, examining, and controlling transport layer data streams.

Reference is now made to FIG. 4, which is a block diagram of an embodiment of a partial representation of the computer method and system for intercepting, examining, and controlling transport layer data streams.

In this embodiment of the method and system, during scanning, the NTI 40 can discriminate among different protocols implemented on top of the transport layer, using different methods of handling each protocol. A protocol is a strict set of rules that govern the exchange of information between computer devices. To communicate successfully; the communicating computers must use the same protocol. Protocols implemented on top of the transport layer include the session layer, which establishes, maintains and coordinates communication, the presentation layer, which converts codes, formats, and displays data, and the application layer which performs specific tasks on the data. Examples of common internet application layer protocols that the NTI might handle include HTTP, SMTP, POP, FTP, and IMAP.

FIG. 4 further illustrates an embodiment of the method and system in which, during scanning, the NTI 40 may be used in conjunction with parsers to track the state of and modify the behavior of selected protocols. This function is performed by the Protocol Parser 41. Parsers are used to discriminate among different protocols implemented on top of the transport layer.

As further depicted in FIG. 4, the NTI 40 can be augmented by translators for translating various layers of network data encryption and authentication. Encryption is the encoding of data to prevent unauthorized access and authentication is the process by which one party in a transaction validates the identity of a second party or validates the integrity of the data being tested. This function is performed by the Protocol Translator 62.

While the invention has been described in detail herein in accordance with certain preferred embodiments, many modifications and changes therein may be effected by those skilled in the art. Accordingly, it is intended by the appended claims to cover all such modifications and changes as fall within the true spirit and scope of the invention.

I claim:

1. A method conducted within a single computer system connected to a network for intercepting, examining, and controlling data flowing via transport connections between the transport layer of an operating system and user applications, said method comprising:
   intercepting with a network traffic interceptor all said data, via a dedicated transport connection connected to said transport layer, flowing between said transport layer and said user application; including generating with said network traffic interceptor transport connections and,
   examining said data for information content, which comprises examining said data to determine if it is scannable for information content or non-scannable for information content, and, if the scannable content contains proscribed code, then blocking said content from being passed to said user application; and
   relaying the data to a destination based on the information content of said data,
   wherein the capacity of said transport connections generated by said network traffic interceptor between the transport layer and the network traffic interceptor is equal to or greater than the capacity of the transport connections created between the network traffic interceptor and user applications.

2. A method as in claim 1 further comprising processing said data, including scanning said data for proscribed data.

3. A method as in claim 2 further comprising preventing said computer system from accessing proscribed data.

4. A method as in claim 3 further comprising monitoring wherein said monitoring includes watching for key words in network traffic.

5. A method as in claim 4 further comprising blocking further transmittal of said key words.

6. A method as in claim 3 further comprising preventing said computer system accessing from accessing proscribed data, by designating said data with a GO designation or a NOGO designation; passing said GO designated data to said user application; and blocking said NOGO designate data from said user application.

7. A method as in claim 6 further comprising communicating the existence of said NOGO designated data.

8. A method as in claim 7 wherein said cominunicating comprises displaying the existence of said NOGO designated data on a dialogue box or message.

9. A method as in claim 6 further comprising logging the existence of NOGO designated data in a log file.

10. A method as in claim 9, wherein said logging includes designating place of origin, date, size and type of said NOGO designated data.

11. A method as in claim 2, further comprising protocol parsing.

12. A method as in claim 2, further comprising protocol parsing, wherein said parser parses code based on data flowing via transport connections between the transport layer of an operating system and user applications.

13. A method as in claim 1 further comprising protocol parsing.

14. The method of claim 13, wherein said protocol parsing parses data flowing via transport connections between the transport layer of an operating system and user applications.

15. A method of claim 1 further comprising decrypting said data.

16. A method as in claim 1 further comprising authenticating said data.

17. A method as in claim 1 wherein said transport layer comprises a Transmission Control Protocol/Internet Protocol (TCP/IP) layer.

18. A method conducted within a single computer system connected to a network for intercepting, examining, and controlling data flowing via transport connections between the transport layer of an operating system and user applications, said method comprising:
   intercepting with a network traffic interceptor all said data, via a dedicated transport connection connected to said transport layer, flowing between said transport layer and said user application; including generating with said network traffic interceptor transport connections and,
   examining said data for information content, which comprises examining said data flowing via transport connections to determine if it is scannable for information content or non-scannable for information content, and, if the scannable content contains proscribed code, then blocking said content from being passed to said user application; and
   relaying the data to a destination based on the information content of said data.

19. A method as in claim 18, wherein said network interceptor examines said data for information content.

20. A method as in claim 18 further comprising processing said data, including scanning said data for proscribed data.

21. A method as in claim 18 further comprising preventing said computer system for accessing proscribed data.

22. A method as in claim 18 further comprising monitoring wherein said monitoring includes watching for key words in network traffic.

23. A method as in claim 22 further comprising blocking further transmittal of said key words.

24. A method as in claim 18 comprising preventing said computer system from accessing proscribed data by designating said data with a GO designation or a NOGO designation; passing said GO designated data to said user application; and blocking said NOGO designate data from said user application.

25. A method as in claim 24 further comprising communicating the existence of said NOGO designated data.

26. A method as in claim 25 wherein said communicating comprises displaying the existence of said NOGO designated data on a dialogue box or message.

27. A method as in claim 24 further comprising logging the existence of NOGO designated data in a log file.

28. A method as in claim 27, wherein said logging includes designating place of origin, date, size and type of said NOGO designated data.

29. A method as in claim 18 further comprising protocol parsing.

30. A method of claim 18 further comprising decrypting said data.

31. A method as in claim 18 further comprising authenticating said data.

32. A method as in claim 18 wherein said transport layer comprises a Transmission Control Protocol/Internet Protocol (TCP/IP) layer.

* * * * *